Dec. 17, 1935.  E. COCKS ET AL  2,024,719
FILTER
Filed Jan. 31, 1933  3 Sheets-Sheet 3
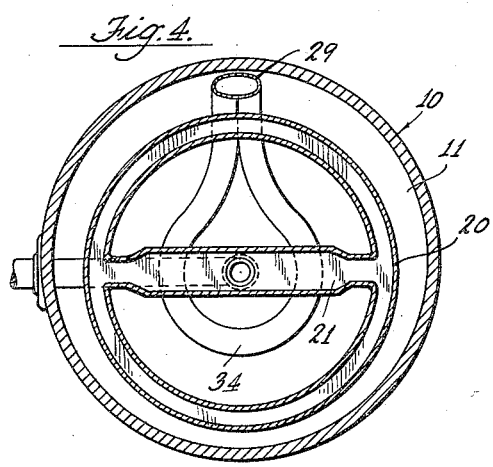
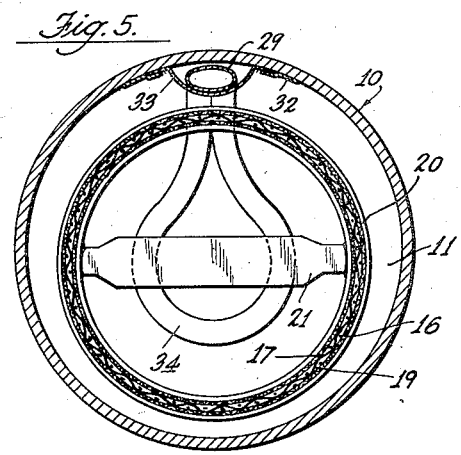
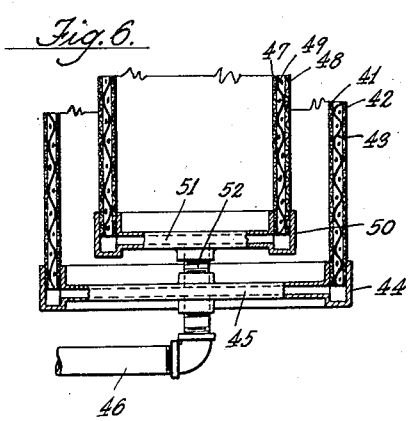
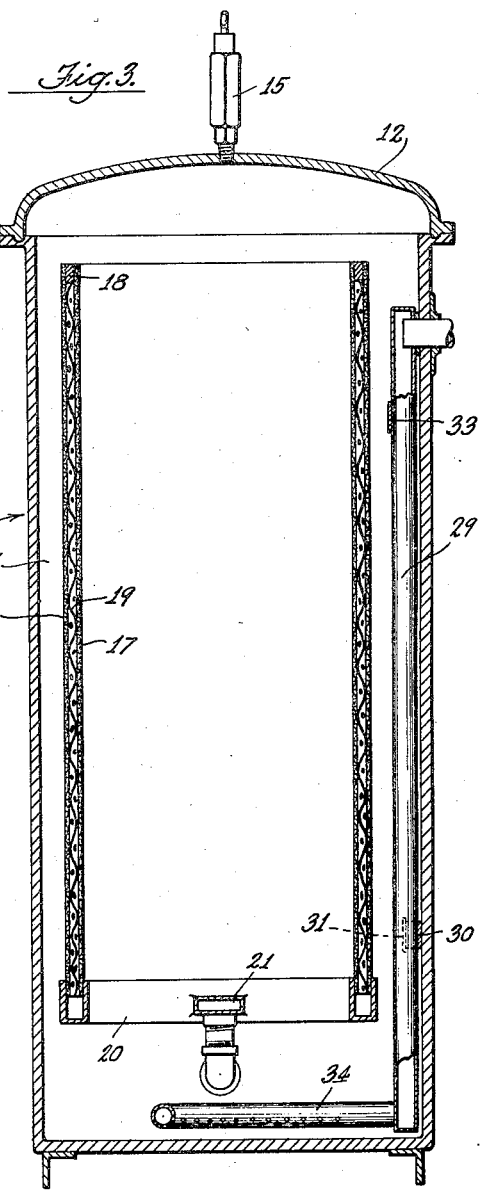
INVENTORS
E. Cocks
L. D. McGown
By Hazard & Miller
ATTORNEYS Patented Dec. 17, 1935

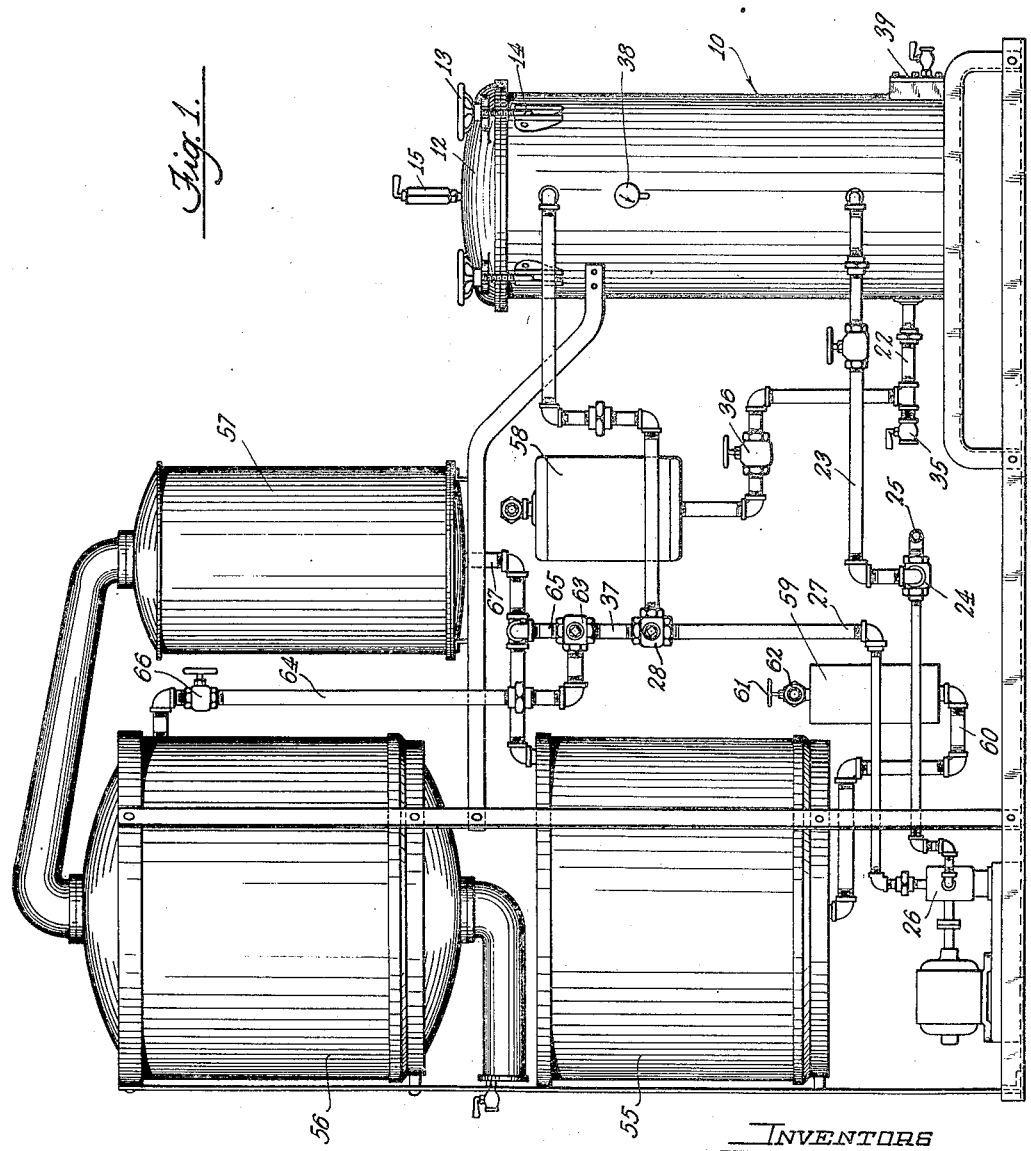

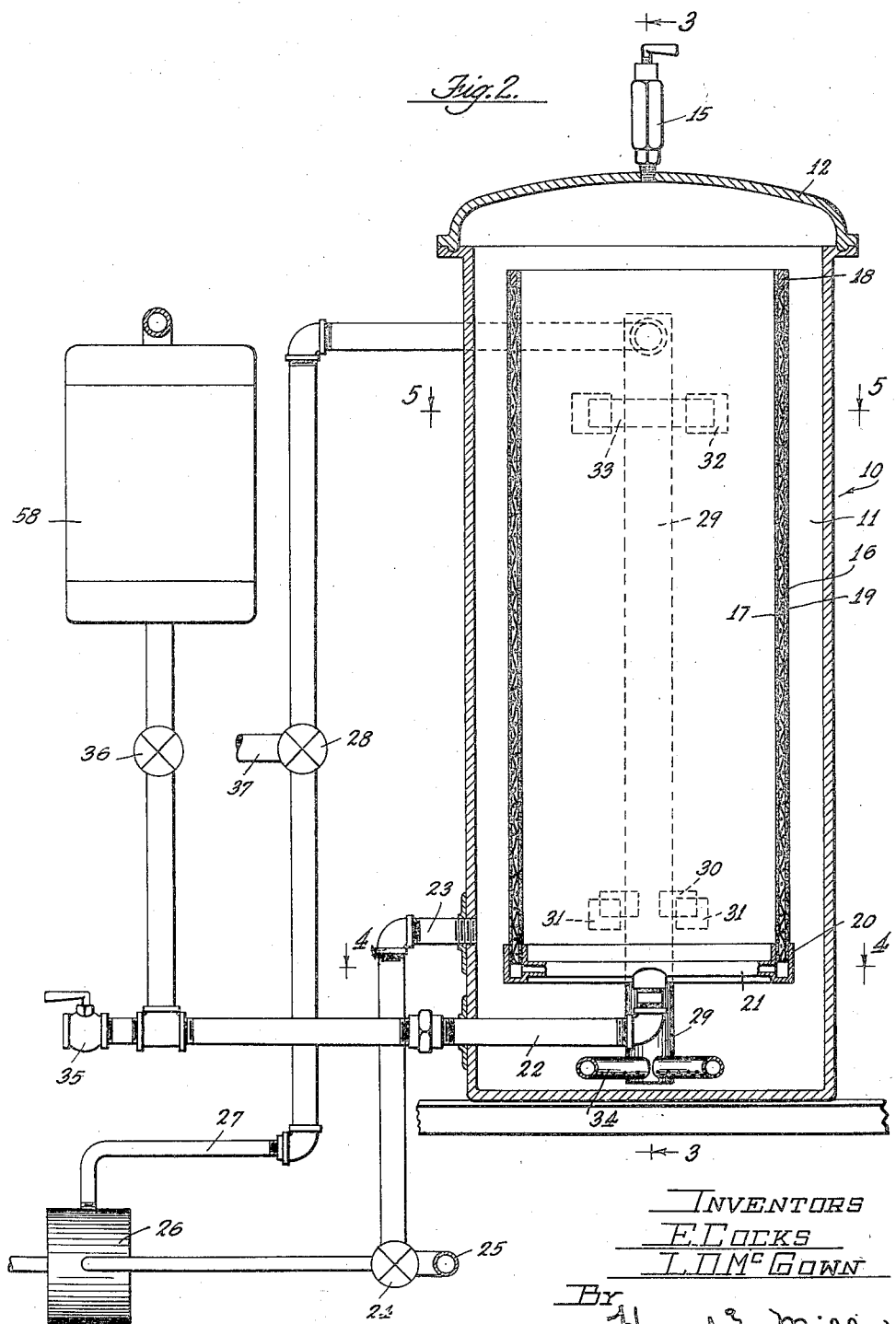

2,024,719

UNITED STATES PATENT OFFICE 2,024,719

FILTER

Edgar Cocks and Lee D. McGown, Los Angeles, Calif., assignors, by mesne assignments, to Los Angeles Wall Bed Co., Los Angeles, Calif., a corporation of California Application January 31, 1933, Serial No. 654,375

3 Claims. (Cl. 210—183)

This invention relates to improvements in filters and particularly to those forms of filters which utilize a finely divided material, such as diatomaceous or infusorial earth carried by the fluid against a screen on which the material collects and through which the fluid is caused to pass during the filtering operation. Heretofore filters have been designed using screens and diatomaceous or infusorial earth has been introduced into the fluid to be filtered and carried thereby against the screen. When a layer of diatomaceous earth on the screen has been impregnated with dirt or foreign matter, the customary practice was to introduce additional infusorial earth into the fluid and thus form a new coating on the screen over the old coating. Due to vibration and other causes, such as for example the cells of the diatomaceous earth becoming impregnated with dirt or being loaded with water when some other fluid was being filtered, the diatomaceous earth is apt to drop off of the screen and collect in the bottom of the filtering chamber where in prior constructions it was allowed to remain as an inert mass until there was occasion to replace all of the diatomaceous earth in the filter with new diatomaceous earth. This permitting of the dropped powder to collect and remain in the bottom of the filtering chamber was not only wasteful but it reduced the efficiency of the filter.

An object of the present invention is to provide an improved form of filter wherein provision is made for continuously or at frequent intervals agitating the fluid in the bottom of the filter chamber so as to throw whatever powder collects there into suspension in the fluid so that it will be carried by the fluid against the screens. The arrangement is such as to prevent or greatly retard the collection of any infusorial earth or powder in the bottom of the filter chamber and to keep it in suspension in the liquid so that it will be carried against the screens.

In prior practice also a layer of diatomaceous or infusorial earth was first built against the screen, following which filtering action took place. Dirt to be filtered out of the fluid collected on the outside of the layer of diatomaceous earth and as this layer of dirt built up an increase in pressure in the filter was noticeable. On introducing additional diatomaceous earth to build up a second layer on the screens, the pressure in the filter was not greatly reduced. Furthermore the interior of any layer of diatomaceous earth beneath the layer of dirt would not be utilized to any great extent inasmuch as it is the outermost surface of diatomaceous earth that does most of the filtering. Consequently in prior constructions it was necessary at relatively frequent intervals to renew the diatomaceous earth used in the filter.

Another object of the present invention is to provide a filter wherein provision is made for quickly producing a reversal of flow through the filter to force all of the diatomaceous earth off of the screens, including the layer or layers of dirt on the layers of diatomaceous earth. In this way, by causing the fluid to reverse its flow and remove the diatomaceous earth from the screens, the agitating mechanism can cause the diatomaceous earth to be thrown into suspension in the fluid when normal operation of the filter is resumed and thus form a new layer of diatomaceous earth against the screens. In this way a given layer or supply of diatomaceous earth can be used over and over again to produce different or successive layers presenting relatively clean outside surfaces against which the major portion of the filtering action takes place.

With the foregoing and other objects in view, which will be made manifest in the following detailed description, and specifically pointed out in the appended claims, reference is had to the accompanying drawings for an illustrative embodiment of the invention, wherein:

Fig. 1 is a view in elevation of an apparatus to be used in conjunction with a washer employed by dry cleaners illustrating the improved filter as forming a part thereof and thus illustrating a practical situation wherein the improved filter may be advantageously employed, it being understood that the use of the improved filter is in no way confined to this apparatus but may be wherever filtering is required.

Fig. 2 is a view in vertical section through the improved filter, essential associated apparatus being somewhat schematically shown.

Fig. 3 is a vertical section taken substantially upon the line 3—3 upon Figure 2.

Fig. 4 is a horizontal section taken upon the line 4—4 upon Figure 2.

Fig. 5 is a horizontal section taken upon the line 5—5 upon Figure 2.

Fig. 6 is a partial vertical section illustrating a modified form of screen construction forming a part of the improved filter.

Referring to the accompanying drawings, wherein similar reference characters designate similar parts throughout, and referring particularly to Figures 2 to 5, the improved filter comprises a suitable container 10 which provides, on its interior, a filtering chamber 11. This container is normally closed by a closure or cover 12 which can be removably secured in place as by hand wheels 13 on hinge bolts 14, see Figure 1. The cover 12 carries a relief valve 15 which is of the conventional type designed to allow air to be expelled from the filtering chamber 11 when the filtering chamber is being filled with a liquid but to close when the liquid level reaches the relief valve and to remain closed until pressure exceeds a predetermined degree, in which event the relief valve acts as a pop-off. Within the filtering chamber a screen unit is disposed and while the construction of this screen unit may vary we prefer to use a screen unit made up of two concentric cylindrical screens the outer of which is indicated at 16 and the inner of which is indicated at 17. These screens are of very fine mesh so that diatomaceous earth may be carried thereagainst by the fluid being filtered and caused to build up a layer of diatomaceous earth on the surfaces of the screens. The upper ends of the screens are separated by a ring 18 and the screens are held spaced from each other against collapse together by means of a coarse wire mesh or heavy screen 19. The space between the screens, which is partially occupied by the coarse wire mesh 19, communicates with an annular manifold 20 having a diametrical manifold part 21 detachably connected to a pipe 22 which enters the filtering chamber 11 near its bottom. Pipe 22 constitutes one outlet leading from the filter for conveying filtered liquid away from the filter. A second outlet is provided by pipe 23 which leads to a three way valve 24 in a pipe 25 coming from a washing machine or any other apparatus delivering a supply of fluid to be filtered. Pipe 25 leads through the three way valve 24 over to a motor driven pump 26, the outlet from which is provided by a pipe 27 leading through three way valve 28 to the filter. Pipe 27 is shown as entering the filter container 10 near its top, although the exact location of entrance may vary. On the inside of the container there is a downwardly extending tube 29 having a slip joint at its top with the end of pipe 27. This tube carries wings 30 near its bottom adapted to enter brackets 31 secured to the inside of container 10. Near the upper end of the tube there are brackets 32 secured to the inside of container 10 and a somewhat U shaped bracket 33 is adapted to be positioned against the tube and have its ends inserted between the brackets 32 and the walls of container 10 to removably fasten tube 29 in place. Tube 29 carries a rose 34 at its bottom, which is located fairly close to the bottom of container 10, and this rose has distributed perforations therein most of which are directed downwardly against the bottom of container 10.

Outlet pipe 22 is branched, one branch having an air inlet valve 35 which can be manually operated to allow air to enter the outlet pipe. 36 designates a valve which can be used to close outlet pipe 22 but when this valve is open filtered fluid may flow through outlet pipe 22 and through the valve back to the washer or to the location wherever the filtered liquid is desired.

In the form of construction shown in Figures 2 to 5 inclusive the operation and advantages are briefly as follows: In order to start up the filter a suitable supply of diatomaceous earth in a finely divided state is introduced into container 10. The cover 12 is replaced and tightened down and the pump 26 is started in operation. Three way valve 24 is so positioned as to permit fluid to flow through pipe 25 from the source of supply and to be pumped by the pump 26 through pipe 27, through open valve 28, and down through tube 29. Valves 35 and 36 may be allowed to remain closed until the container 10 is filled with liquid and the air has been exhausted through relief valve 15. When the container 10 has been filled with liquid and the air exhausted, outlet valve 36 should be immediately opened to permit fluid to flow through the outlet and delivered to the washer where the filter is used in conjunction with the dry cleaning apparatus. It will be noted that the incoming fluid discharges through the rose 34 against the bottom of container 10 and throws the diatomaceous earth into suspension in the liquid. The liquid in flowing through the screens into the space partially occupied by the heavy wire mesh 19 carries the diatomaceous earth against the screens and builds up a layer of this filtering medium thereon. When the filter is used in conjunction with a washer, the liquid is at first merely allowed to circulate through the washer. That is liquid is permitted to be supplied to the washer through outlet pipe 22 and through valve 36 and is allowed to return through pipe 25 and to be recirculated through the filter. The liquid as it passes through the washer is washed and will quickly clear up during continued operation of the filter indicating that a suitable filtering layer of diatomaceous earth has been built up on the screens. The rose 34 acts as a form of agitator in the bottom of container 10, initially agitating the diatomaceous earth in the container and throwing it into suspension in the liquid so that it can be carried by the liquid against the screens. If the diatomaceous earth for any reason, such as vibration or the fact that it has become so loaded with dirt that it will no longer be held against the screens, has a tendency to drop or settle in the bottom of container 10, this continued agitation produced by the issuing or discharging streams of incoming fluid throws this powder back into suspension in the liquid so as to be again carried against the screens. In this way the incoming fluid by the agitation it produces in the container 10 causes the layer of diatomaceous earth on the screens to be continually formed and preserved. It prevents the collection of any diatomaceous earth in the bottom of container 10.

Continued operation of the filter causes dirt to form in a layer on the outside or incoming side of the layers of diatomaceous earth on the screen. The interior or outlet side of each layer of diatomaceous earth while in a condition to be utilized is not available for use because of the layer of dirt on the outside and the fact that most of the filtering action takes place on the surface of the layer. Under these circumstances from time to time it is desired to remove each layer of diatomaceous earth entirely from the screens and cause this same diatomaceous earth to be reformed into a new layer, thus efficiently utilizing all of the powder. To accomplish this, three way valve 24 is turned so as to shut off pipe 25 and connect pipe 23 with pump 26. Three way valve 28 is also turned so that pipe 27 is connected to pipe 37 which leads to any suitable storage reservoir. When valve 28 is so turned it closes that portion of pipe 27 which leads to tube 29 and valve 36 and with the valve so positioned the pump is started in operation. With the valve so arranged it will be noted that pipe leading to tube 29 is closed and that outlet pipe 22 is likewise closed. The pump 26 will then build up a vacuum in container 10 on the inlet sides of the screens tending to produce a reverse flow through the filter. In other words whereas in initial operation fluid will flow from the outside of screen 16 through it and from the inside of screen 17 through it, with this reverse flow the pump will tend to draw fluid from the space between the screens outwardly through screen 16 and inwardly through screen 17. Inasmuch as valve 36 is closed, however, this flow cannot take place and a vacuum is allowed to be built up. When the vacuum is produced, valve 35 constituting an air inlet is suddenly opened, allowing air to suddenly enter manifold 20 and to enter the space between the screens. This sudden reverse flow breaks or kicks the layer of diatomaceous earth off of the screens and by having a cylindrical screen unit made up of concentric screens this sudden supply of air is equally distributed between them so that the reversal of flow through the screens does not become localized at any one place. With the layer of diatomaceous earth thus removed from the screens, it is effectively mixed and on returning the valves to their initial positions and resuming normal direction of flow a new layer or layers of diatomaceous earth will be formed on the screens, thus causing the filter to operate substantially as efficiently as where new powder is substituted for the entire amount of diatomaceous earth in container 10. In this way by destroying a formed layer of diatomaceous earth on the screens and causing the same diatomaceous earth to reform in a new layer, a given supply of diatomaceous earth can be used over and over with practically the same efficiency as new powder.

The condition of the layers of diatomaceous earth on the screens can be indicated by a pressure gauge 38, see Figure 1, which may be mounted on the side of container 10. When the filter becomes dirty by the formation of a heavy layer of dirt on the layers of diatomaceous earth, the pressure required to force the liquid through the diatomaceous earth and through the screens increases, which will be indicated by the pressure gauge. If in the course of continued runs it is found that the pressure indicated by pressure gauge 38 builds up too quickly, this will indicate that all of the diatomaceous earth in container 10 has been virtually used up insofar as its filtering efficiency is concerned and that the entire amount of diatomaceous earth in the container should be replaced with new powder. In this event liquid in the container 10 may be removed therefrom and a suitable hand hole cover 39 in the bottom of the container may be removed to facilitate cleaning out all of the old diatomaceous earth from the container.

In Figure 6 a modified form of screen unit is disclosed wherein a plurality of pairs of concentric screens are used to increase the available filtering surface. In this form of construction the outer pair of filtering screens is indicated by the reference characters 41 and 42 which are held in spaced relation by an intermediate heavy wire mesh 43. The screens of this outer pair are mounted in a manifold 44 having a diametrical portion 45 connected to the outlet pipe indicated in this figure at 46. An inner pair of screens is made up of screens 47 and 48, these being concentric and cylindrical also and being likewise spaced by an intermediate heavy wire mesh 49. The lower ends of these screens are disposed in a manifold 50 similar to manifold 44 except smaller in size. This manifold has a diametrical portion 51 which is connected as indicated at 52 to the center of diametrical portion 45 of manifold 44. This construction increases the available filtering surface but at the same time enables air to be quickly distributed through both pairs of screens when air is admitted to the outlet pipe from the filter to effect a removal of the diatomaceous earth layers on the screens.

Figure 1 illustrates the filter embodying the invention as being incorporated in an apparatus to be used in conjunction with a dry cleaning washer. In this figure there is a storage reservoir 55, a still 56, a condenser 57, a cooler 58, and a water trap 59. The water trap 59 is connected to the pipe 60 leading from the storage reservoir and the pipe leading from the storage reservoir has a valve 61. This pipe, indicated at 62, leads to the washer. Pipe 25 coming back from the washer is indicated by the same reference character on this figure. This pipe leads to the three way valve 24, which in turn is connected to outlet pipe 23. The pump 26 is given the same reference character in this figure and the pipe 27 leading to the filter is indicated. Three way valve 28 is indicated by the same reference character 28 and pipe 27 leads through this three way valve to the top of container 10 and the upper end of tube 29 therein. Pipe 37 leading from the three way valve 28 leads to a three way valve 63 from which pipes 64 and 65 lead, pipe 64 leading through a valve 66 to the still 56. Pipe 65 enters a pipe 67 coming from still 57 and running over to storage tank 55. Outlet pipe 22, given the same reference character on this figure, is branched as before having the air inlet valve 35 and valve 36. The branch containing valve 36 leads through cooler 58 and then over to the washer.

In operating this apparatus, which includes the filter, to initially start the apparatus valve 61 is opened so as to permit the cleaning solvent in the storage reservoir 55 to run through the water trap 59 and over to the washer, after which it is closed. The pump is then started up and liquid is returned from the washer through pipe 25, through pipe 24, through pump 26, pipe 27, valve 28, through tube 29 in the filter, and caused to be discharged into the container 10. Valve 36 is left open. The filter container 10 will first be filled to expel the air through the relief valve 15 and then sufficient pressure will be developed to force the liquid through the screens and through the outlet pipe 22. As the liquid flows through the screens it builds up the layer of diatomaceous earth on them, the diatomaceous earth in the bottom of the container being thrown into suspension in the liquid by the liquid discharging through the perforated rose 34. The filtered liquid on passing through outlet pipe 22, valve 36, and cooler 58, is then returned to the washer, from which it comes back to the pump through pipe 25. A continued operation of the apparatus in this condition will cause the liquid circulated through the washer to quickly clear up, it being understood that in the first few minutes of operation the liquid carries some of the diatomaceous earth with it, which is quickly removed during the continued circulation. When the liquid clears up, the washer is in condition to be operated. When it is desired to clean the screens by kicking off the old layer of diatomaceous earth thereon, valve 36 is closed and valve 28 is turned so as to connect pipe 27 leading from the pump to pipe 37. Three way valve 63 is turned so as to connect pipe 37 with pipe 64 leading to the still. Three way valve 24 is turned so as to connect pipe 23 with pump 26 and to shut off pipe 25. When the pump is then started in operation, it tends to produce the partial vacuum in container 10 and to discharge whatever liquid is removed therefrom into still 56. Under these conditions still 56 merely constitutes a storage reservoir for the liquid while the layers of diatomaceous earth are being kicked off of the screens on suddenly opening air inlet 35 after the vacuum has been generated. The purpose of the other piping illustrated on Figure 1 forms no part of the present invention but will be readily understood by those familiar with the art of dry cleaning apparatus.

From the above described constructions it will be appreciated that an improved filter is provided wherein provision is made for continually agitating the liquid in the filter chamber near its bottom so as to stir up any powder or diatomaceous earth tending to collect therein and throw it into suspension in the liquid to be carried by the liquid against the screens. Furthermore provision is made for kicking off the layers of diatomaceous earth from the screens by producing a sudden reversal of flowing and retaining this diatomaceous earth in the filtering chamber and causing it to be thrown back into suspension in the liquid to reform a new layer on the screens, thus prolonging the usefulness and life of a given supply of diatomaceous earth and enabling clean filter layers to be easily and quickly formed.

Various changes may be made in the details of construction without departing from the spirit or scope of the invention as defined by the appended claims.

We claim:

1. A filter comprising means providing a closed filtering chamber having an inlet and an outlet, screen means in the filtering chamber between the inlet and the outlet, pump means for forcing liquid to be filtered through the filtering chamber, the screen means being adapted to have a comminuted material deposited thereon, means for causing the pump means to attempt a reversal of flow through the screen means, and valve means in the outlet for shutting the outlet until at least a partial vacuum is built up by the pump means in the filtering chamber and then allowing air to suddenly enter the outlet, thus permitting sudden reversal of flow, causing a removal of the comminuted material from the screen means to clean the screen means.

2. A filter comprising means providing a closed filtering chamber having an inlet and an outlet, screen means in the filter chamber between the inlet and the outlet adapted to have a comminuted material applied thereto, pump means for forcing liquid to be filtered through the inlet into the filtering chamber, a valve controlled pipe connecting the inlet side of the filtering chamber to the inlet of the pump, valve means for diverting liquid delivered from the pump from the inlet whereby upon proper manipulation of the valves the pump may be caused to attempt reverse flow through the screen means, and valve means in the outlet for closing the outlet until the pump has built up a partial vacuum in the filtering chamber, and then allowing air to suddenly enter the outlet thus permitting a sudden reverse flow through the screen means, thus removing the comminuted material therefrom to effect a cleaning of the screen means.

3. A filter comprising means providing a closed filtering chamber having an inlet and an outlet, screen means in the filtering chamber between the inlet and the outlet, means providing a storage reservoir, a pump for forcing the liquid to be filtered through the filtering chamber, a pipe leading from the outlet side of the pump, valve means in the pipe for optionally connecting the outlet side of the pump with the inlet to the filter chamber or to the storage reservoir, valved means for optionally connecting the inlet side of the pump with the inlet side of the filter chamber or a source of liquid to be filtered, the outlet side of the filter chamber having a valve controlled opening for admitting air thereto, and a valve controlling the outlet from the filter chamber whereby upon proper manipulation of the valves the pump may be caused to attempt reverse flow through the screen means and upon the building up of a suitable vacuum the air inlet may be opened to suddenly permit reverse flow to effect cleaning of the screens.

EDGAR COCKS.
LEE D. McGOWN.